United States Patent Office 3,178,258
Patented Apr. 13, 1965

3,178,258
SEPARATION OF PLUTONIUM HEXAFLUORIDE FROM URANIUM HEXAFLUORIDE BY SELECTIVE SORPTION
George I. Cathers, Knoxville, and Robert L. Jolley, Oak Ridge, Tenn., assignors to the United States of America as represented by the United States Atomic Energy Commission
No Drawing. Filed Aug. 30, 1962, Ser. No. 220,970
9 Claims. (Cl. 23—14.5)

The present invention relates to a method of separating plutonium from uranium. More particularly it relates to a method for separating gaseous plutonium hexafluoride from gaseous uranium hexafluoride by selective sorption.

Among the more important classes of neutron-irradiated nuclear fuels which require chemical processing are those consisting of natural or slightly enriched uranium containing plutonium in sufficient amounts to warrant its recovery. The uranium in such cases may be used in its elemental form, as a compound such as $UO_2$ or UC, or alloyed with another metal to improve its physical properties, or alloyed with plutonium. Of the available separation processes for the recovery of uranium and plutonium from such fuels, the so-called "fluoride volatility processes" offer unique advantages. In a fluoride volatility process, the metallic species in the fuel, including uranium and plutonium, are all converted to their respective fluorides by hydrofluorination, for example, and the uranium is subsequently fluorinated to its volatile hexafluoride. In cases where the fuel element is clad with aluminum, zirconium or stainless steel, the initial operation requires dissolution of the clad by immersion of the fuel element in a fused fluoride salt mixture. Dissolution takes place by hydrofluorination of the element by bubbling hydrogen fluoride through the fused fluoride salt mixture. The resultant uranium tetrafluoride is then fluorinated with gaseous fluoride and removed from the melt as a volatilized $UF_6$ product. The uranium hexafluoride vapor can be further decontaminated by distillation or by sorption on, followed by desorption from, a porous mass of sodium fluoride. A portion of the plutonium is known to remain in solution in the fused fluoride melt as the tetrafluoride and a minor portion has apparently volatilized as plutonium hexafluoride.

Two approaches for the separation and recovery of the plutonium from fused fluoride salt mixtures have been proposed, neither of which are entirely satisfactory. In one case, it has been suggested that the plutonium can be completely volatilized along with the uranium and that final separation of the two species from each other and decontamination from other volatile radioactive species can proceed by fractional distillation. This approach has not proved feasible because the plutonium hexafluoride is not stable long enough to permit a thorough separation by distillation techniques. In the second approach, it has been proposed to treat the non-volatile hydrofluorinated fused fluoride residue containing plutonium and fission products by solvent extraction techniques to recover the plutonium. This approach is technically feasible, but is suffers from the disadvantage that the entire fused fluoride residue must be dissolved to form a highly radioactive solvent extraction feed solution of exceedingly large volume. Solvent extraction results in the formation of still larger radioactive liquid volumes, all of which must be safely disposed. The economics of storage and handling of large volumes of radioactive solutions detracts considerably from employing this method to separate plutonium values.

With this general definition of the problem in mind, it is a first object of this invention to separate plutonium from uranium. A general object of this invention is to separate plutonium hexafluoride from uranium hexafluoride. Another object of this invention is to separate and recover plutonium and uranium from a fused fluoride salt mixture. A further object of this invention is to separate plutonium hexafluoride and uranium hexafluoride from a gaseous fluoride mixture of these and other volatile halides, and to further separate said plutonium hexafluoride and uranium hexafluoride each from the other by selective sorption.

The objects of this invention are achievable by contacting a gaseous mixture containing volatilized uranium hexafluoride and plutonium hexafluoride with a porous mass of a metal fluoride selected from the group lithium fluoride, sodium fluoride and calcium fluoride under conditions to be hereinafter specifically delineated to selectively sorb the plutonium hexafluoride on said porous mass and thereafter recovering a highly purified uranium-free plutonium product. Final recovery of the selectively sorbed plutonium values in purified form may then be effected by various simple operations depending upon the sorbent used.

Having stated the general principle of the invention, reference will now be made to a representative example which includes a set of typical experiments to demonstrate the sorptive capacity of the selected metal fluorides for gaseous plutonium hexafluoride and to an experiment which demonstrates the high degree of separation which can be achieved between plutonium and uranium.

EXAMPLE

Since one of the principal areas of utility of this invention lies in its applicability to the processing of a fused fluoride melt which is used to dissolve nuclear fuel elements of the class described, the following experiments will demonstrate recovery of plutonium from a fused fluoride mixture consisting of 50 grams of a fluoride salt mixture containing 31, 24 and 45 mole percent lithium fluoride, sodium fluoride and zirconium tetrafluoride, respectively, said mixture being spiked with two parts plutonium per million parts of fluoride salt. This mixture was placed in an air-tight fluoride-resistant reactor vessel fabricated from nickel. The vessel was provided with an inlet for admitting fluorine near the reactor bottom to allow gaseous fluorine to bubble through the volume of a fused melt of the said fluoride salt mixture, an entry port at the top of the vessel for introduction of the salt mixture and a length of nickel tubing extending from the interior of the vessel above the salt mixture to carry volatilized plutonium and uranium hexafluoride from said vessel through a series of three cartridges containing the selected sorption agent. The tubing terminated in a bed of soda lime to absorb excess fluorine and trap any escaping radioactivity. The nickel reactor vessel was enclosed by a clam-shell type furnace capable of heating the fluoride mixture in the reactor to a fused state. The procedure consisted of inserting the lithium fluoride-sodium fluoride-zirconium tetrafluoride mixture or some other suitable fluoride salt mixture such as a 50–50 mole percent mixture of NaF and $ZrF_4$, broken up into pea-size lumps into the reactor vessel, after which 100 microliters of a plutonyl nitrate solution containing about one gram of plutonium per liter was placed over the salt. The reactor was then heated slowly while sparging the mixture with helium in order to effect decomposition of the aqueous plutonium-spiked solution. After the reactor had reached the desired operating temperature of 600° C., the helium flow was stopped and a flow of gaseous fluorine was commenced which bubbled through the volme of the resultant fused salt mixture. The fluorine flow was maintained at a rate averaging 100 milliliters per minute for a period of about 20 hours. Salt samples were taken at intervals during fluorination by inserting a cold nickel rod into the fused fluoride melt and quickly withdrawing it before the frozen salt could remelt. The salt samples were analyzed for plutonium and it was found that the amount of plutonium in the melt was a steadily decreasing function of time. After 20 hours of fluorination, it was found that only 1.4 percent of the plutonium remained in the melt, with the remainder having been volatilized. Since this indicated that substantially all the plutonium could be volatilized from the melt, a number of other runs were conducted in the same manner with similar fused salt charges, but shorter periods of fluorination were used to obtain sufficient amounts of volatile plutonium hexafluoride for passage through the cartridges of the selective metal fluoride absorbent. In all tests, the plutonium retained in the fused salt decreased during fluorination showing volatilization of the plutonium. The rate of plutonium disappearance from the fused salt had an approximately first order dependence on the concentration of plutonium in the salt with the total amount of plutonium transfer of the melt. In one run, Run 12, where the first cartridge contained calcium fluoride, the fluorine used in effecting volatilization of the plutonium contained 7 mole percent uranium. The results of several typical runs conducted according to the above-described procedure are shown in the table below.

solved in an aqueous nitric acid solution to form a solution of plutonyl nitrate. This solution may then be treated by known solvent extraction techniques to secure a highly purified and decontaminated plutonium product.

Referring now to Runs 5–9, where sodium fluoride was used in the first metal fluoride-containing cartridge, it is known that gaseous uranium hexafluoride will form a non-volatile complex with sodium fluoride. The vapor pressure of said complex is quite low at moderate temperatures, but is sufficiently high at temperatures of above 250° C. so that it may be effectively desorbed from the sodium fluoride. It is to be noted, however, that even at a temperature as high as 400° C. the sodium fluoride had a selective sorptive effect on the plutonium and was effective in sorbing 89 percent of the plutonium volatilized from the fused melt. It is clear, then, that by contacting a gaseous mixture of uranium hexafluoride and plutonium hexafluoride with a porous mass of sodium fluoride at a temperature of about, and preferably in excess of, 400° C., the uranium hexafluoride will pass through unaffected, while the bulk of the plutonium hexafluoride will be selectively sorbed. By providing a sufficient amount of sodium fluoride at 400° C. a quantitative deposition of plutonium will be effected.

The sodium fluoride mass may be dissolved in an aqueous solution of nitric acid to form a solution of plutonyl nitrate from which the plutonium may be re-

*Table I*

| Run No. | Description of Absorption Beds | | | Percent Pu Volatilized | Percent Distribution of Volatile Pu Sorbed on | |
|---|---|---|---|---|---|---|
| | No. 1 | No. 2 | No. 3 | | Bed 1 | Bed 2 |
| 1 | 8 g. LiF, 25° C | 8 g. NaF, 25° C | | 63.1 | 83.7 | |
| 2 | 8 g. LiF, 100° C | 8 g. NaF, 100° C | | 62.9 | 69.6 | |
| 3 | 8 g. LiF, 400° C | 8 g. LiF, 100° C | | 21.0 | 3.3 | |
| 4 | 8 g. LiF, 400° C | 8 g. NaF, 100° C | 8 g. LiF, 100° C | 61.7 | 6.0 | 84 |
| 5 | 8 g. NaF, 25° C | 8 g. NaF, 25° C | | 53.1 | 103.7 | |
| 6 | 8 g. NaF, 25° C | 8 g. NaF, 25° C | | 67.5 | 42.7 | |
| 7 | 5 g. NaF, 100° C | 5 g. LiF, 100° C | | 23.7 | 50.2 | |
| 8 | 5 g. NaF, 100° C | 5 g. NaF, 25° C | | 52.7 | 36.4 | |
| 9 | 8 g. NaF, 400° C | 8 g. NaF, 70° C | | 16.5 | 89.0 | |
| 10 | 8 g. CaF$_2$, 25° C | 8 g. NaF, 25° C | | 90.5 | 102.6 | |
| 11 | 8 g. CaF$_2$, 100° C | 8 g. CaF$_2$, 25° C | | 75.1 | 97.2 | |
| 12 | 8 g. CaF$_2$, 100° C | 8 g. NaF, 25° C | 25 g. NaF, 25° C | 65.7 | 94.7 | |
| 13 | 8 g. CaF$_3$, 400° C | 8 g. CaF$_2$, 50° C | | 53.1 | 90.0 | |

The data in the table clearly show that the bulk of the volatilized plutonium hexafluoride was trapped by the selective metal fluoride sorbents under the conditions stated.

Referring to Runs 1–4, where the volatilized plutonium hexafluoride was contacted with a porous mass of lithium fluoride, it is known that lithium fluoride unlike other alkali metal fluoride salts, does not react with uranium hexafluoride. As clearly shown in Runs 1–4, the plutonium can be effectively trapped in a mass of lithium fluoride at a temperature of from 25° C. up to a temperature somewhat less than 400° C. At higher temperatures the plutonium hexafluoride passes through the lithium fluoride to be sorbed on the following sodium fluoride bed. Thus, with lithium fluoride, separation of plutonium hexafluoride and uranium hexafluoride from a gaseous mixture is simply effected by passing said gaseous mixture through a porous mass of lithium fluoride maintained at a temperature below 400° C. In the case where lithium fluoride is used as the selective sorbent, the plutonium values may be effectively desorbed by passing a stream of gaseous fluorine at a temperature of at least about 400° C. through the plutonium-laden lithium fluoride mass to revolatilize the plutonium as the hexafluoride and to achieve a measure of decontamination from fission product fluorides sorbed on the lithium fluoride. The revolatilized plutonium hexafluoride may then be recovered by collecting it in a cold trap maintained below the desublimation temperature of PuF$_6$. Alternatively, the plutonium-sorbed lithium fluoride mass may be discovered in highly purified form by subjecting said solution to well-established solvent extraction cycles.

Runs 10–13 show that a bed of calcium fluoride will quantitatively sorb plutonium hexafluoride at a temperature between 25° C. to 400° C. In the case of calcium fluoride, a gaseous mixture containing plutonium hexafluoride and uranium hexafluoride was passed through in contact with a porous mass of calcium fluoride at a temperature in the range 25° C. to 400° C. to selectively sorb plutonium values thereon. The uranium is unaffected by such contact and simply passes through the calcium fluoride mass effectively decontaminated from plutonium and vice versa. Final recovery and purification of the plutonium may be effected by dissolving the plutonium-laden calcium fluoride mass in an aqueous solution of nitric acid and the resultant solution treated by well-known solvent extraction techniques to obtain a purified plutonium product.

It should be noted that while the final recovery of plutonium utilizing the present invention may include solvent extraction from an aqueous solution of plutonium, the volume of said solution, in comparison to the solution obtained by dissolution of the entire fluoride salt mixture, will be smaller by several orders of magnitude so that the final volume of radioactive liquid waste which must be handled and stored is also considerably reduced. The cost of the selective sorbents used is relatively nominal and may be purchased from standard commercial sources, preferably as the analytical grade material. The material does not require any treatment since it can be purchased in finely divided form up to ⅛ inch pellets, all of which are eminently useful to sorb the desired plutonium values. Moreover, in the case where gaseous fluorine is used to desorb the plutonium from the selected metal fluoride mass, the stoichiometric excess of fluorine used is easily recoverable from the resultant plutonium hexafluoride-fluorine gaseous stream and can be recycled for further use. Of particular note is Run 12 where the fluorine used in the volatilization of the plutonium from the fused salt contained 7 mole percent uranium hexafluoride. The results obtained by analyzing the $CaF_2$ bed for plutonium and uranium are given below.

*Table II*

| | Amount Sorbed | | | | | |
|---|---|---|---|---|---|---|
| | Plutonium, micrograms | | | Uranium, grams | | |
| | Bed 1 ($CaF_2$) | Bed 2 (NaF) | Bed 3 (NaF) | Bed 1 ($CaF_2$) | Bed 2 (NaF) | Bed 3 (NaF) |
| Run 12 | 62 | 0.1 | 0.1 | 0.05 | 6.02 | 17.9 |

The separation factor for plutonium in Run 12 on the bed of calcium fluoride was 451 calculated as follows:

$$\text{Separation factor (Pu)} = \frac{\text{Pu Bed 1/Pu total volatile}}{\text{U Bed 1/U total volatile}}$$

$$= \frac{62 \times 10^{-6} \text{ gm.}/65.7 \times 10^{-6} \text{ gm.}}{.05 \text{ gm.}/24 \text{ gm.}}$$

$$= 451$$

By a similar calculation, the separation factor for uranium in Beds 2 and 3 containing sodium fluoride at 25° C. was shown to be 330.

While the separative effect of the selected metal fluoride has been demonstrated by use of fluoride salt mixture, it will be evident that this invention may be utilized in any situation where the problem of separating gaseous plutonium hexafluoride and gaseous uranium hexafluoride from a gaseous mixture, each from the other, exists.

Whenever the term "sorption" is used it is meant to describe the process of selective deposition of plutonium values on the porous mass of the selected metal fluoride from a gaseous mixture containing $PuF_6$ and $UF_6$, with no reference or suggestion being intended as to the exact mechanism or mechanisms which operate to effect the desired separation.

Having thus described our invention, we claim:

1. A process for separating plutonium from a gaseous mixture comprising $PuF_6$ and $UF_6$ values which comprises passing said gaseous mixture through and in contact with a porous mass of lithium fluoride at a temperature in the range 25° C. to no greater than about 400° C. to thereby selectively sorb said plutonium hexafluoride thereon.

2. A process for separating plutonium from a gaseous mixture comprising $PuF_6$ and $UF_6$ values which comprises passing said gaseous mixture through and in contact with a porous mass of lithium fluoride at a temperature in the range 25° C. to no greater than about 400° C. to thereby selectively sorb said plutonium hexafluoride within said lithium fluoride mass and thereafter recovering said sorbed plutonium from said lithium fluoride.

3. A process for separating plutonium from a gaseous mixture comprising $PuF_6$ and $UF_6$ values which comprises passing said gaseous mixture through and in contact with a porous mass of sodium fluoride at a temperature in excess of 400° C. to selectively sorb plutonium within said mass.

4. A process for separating plutonium from a gaseous mixture comprising $PuF_6$ and $UF_6$ values which comprises passing said gaseous mixture through and in contact with a porous mass of sodium fluoride at a temperature in excess of 400° C. to selectively sorb plutonium within said mass and thereafter recovering said sorbed plutonium.

5. A process for separating plutonium from a gaseous mixture comprising $PuF_6$ and $UF_6$ values which comprises passing said gaseous mixture through and in contact with a porous mass of calcium fluoride at a temperature in the range 25° C. to 400° C. to thereby selectively sorb said $PuF_6$ within said calcium fluoride mass.

6. A process for separating plutonium from a gaseous mixture comprising $PuF_6$ and $UF_6$ values which comprises passing said gaseous mixture through and in contact with a porous mass of calcium fluoride at a temperature in the range 25° C. to 400° C. to thereby selectively sorb said $PuF_6$ within said calcium fluoride mass and thereafter recovering said sorbed plutonium from said calcium fluoride mass.

7. A process for selectively recovering plutonium fluoride values from a gaseous mixture comprising plutonium hexafluoride and other volatile metal fluoride values which comprises passing said gaseous mixture through, and in contact with, a porous mass of lithium fluoride at a temperature in the range 25–400° C.

8. A process for selectively recovering plutonium fluoride values from a gaseous mixture comprising plutonium hexafluoride and other volatile metal fluoride values which comprises passing said gaseous mixture through, and in contact with, a porous mass of sodium fluoride at a temperature in excess of 400° C.

9. A process for selectively recovering plutonium fluoride values from a gaseous mixture comprising plutonium hexafluoride and other volatile metal fluoride values which comprises passing said gaseous mixture through, and in contact with, a porous mass of calcium fluoride at a temperature in the range 25–400° C.

References Cited by the Examiner

UNITED STATES PATENTS 3,046,089  7/62  Steindler _____ 23—14.5

FOREIGN PATENTS 595,302  3/60  Canada _____ 23—14.5
618,686  4/61  Canada _____ 23—14.5

OTHER REFERENCES

Industrial and Engineering Chemistry, vol. 50, No. 2, February 1958, pp. 187–191.

Atomic Energy Commission Document ORNL–2993, Sept. 26, 1960, pp. 68–74.

CARL D. QUARFORTH, *Primary Examiner.*